United States Patent [19]

Miller et al.

[11] Patent Number: 5,023,535
[45] Date of Patent: Jun. 11, 1991

[54] HIGH RESOLUTION PULSE WIDTH MODULATION

[75] Inventors: John A. Miller; Richard S. Leemhuis; Rajamouli Gunda, all of Rochester Hills, Mich.

[73] Assignee: Vickers, Incorporated, Troy, Mich.

[21] Appl. No.: 341,212

[22] Filed: Apr. 21, 1989

[51] Int. Cl.$^5$ ............................................. G05B 11/28
[52] U.S. Cl. .................................. 318/599; 363/129; 91/362
[58] Field of Search ................. 318/599, 811; 363/129; 91/362, 361, 363, 459

[56] References Cited

U.S. PATENT DOCUMENTS

| | | |
|---|---|---|
| 4,456,865 | 6/1984 | Robertson, Jr. et al. ............ 318/599 |
| 4,577,269 | 3/1986 | Abbondanti ........................ 363/129 |
| 4,757,747 | 7/1988 | Blotter et al. ...................... 91/362 |

Primary Examiner—William M. Shoop, Jr.
Assistant Examiner—Saul M. Bergmann
Attorney, Agent, or Firm—Barnes, Kisselle, Raisch, Choate, Whittemore & Hulbert

[57] ABSTRACT

An electrohydraulic servo system in which a microprocessor-based controller directs a pulse width modulated control signal to a servo valve for controlling flow of hydraulic fluid therethrough. Duration of each half-cycle in the pulse width modulated control signal is separately controlled by selectively incrementing or decrementing duration of the half-cycle in increments of the microprocessor clock period. Signal transition is controlled by a timer interrupt in which time required to enter the interrupt routine is measured following generation of the interrupt, and further operation is delayed by a complementary time, so that control signal transition takes place a fixed preselected number of clock periods after generation of a timer interrupt. In this way, timer interrupt latency is eliminated, and resolution of the pulse width modulated signal is enhanced through individual duration control of the signal half-cycles while maintaining a fixed modulated signal period.

5 Claims, 3 Drawing Sheets

HIGH RESOLUTION PULSE WIDTH MODULATION

The present invention is directed to generation of pulse width modulated signals for control of electrical and electromechanical devices, particularly electrohydraulic devices such as servo valves.

BACKGROUND AND OBJECTS OF THE INVENTION

U.S. Pat. No. 4,757,747 discloses an electrohydraulic system that includes a plurality of electrohydraulic devices, specifically a plurality of actuator-controlling servo valves, individually controlled by on-board microprocessor-based control electronics. Each individual device controller is connected to and addressable by a master controller for coordinating operation among the various devices. Copending U.S. application Ser. No. 07/412,211, filed Sept. 25, 1989 and assigned to the assignee hereof, discloses a variable displacement hydraulic pump with addressable on-board microprocessor-based control electronics, pump sensors and pump-control servo valve packaged in a single assembly. In each disclosure, the servo valve is driven by a pulse width modulated valve control signal generated in the microprocessor-based electronics. U.S. Pat. Nos. 4,502,109 4,581,699, 4,612,489, 4,625,622, 4,643,074, 4,651,272, 4,714,005, 4,741,159 and 4,744,218 disclose systems suitable for implementation in microprocessor-based digital control of electrohydraulic devices, such as servo valve-controlled actuators and pumps.

Digital servo-valve control, particularly on-board microprocessor-based control, has thus enjoyed substantial acceptance and success. However, some problems which inhere in digital control techniques remain to be addressed. Resolution of the pulse width modulated valve control signal, which must be significantly higher than the natural frequency of the valve to avoid fatiguing the servo valve's torque motor, typically does not approach that of the valve itself. For example, at a pulse width modulation frequency 2,000 Hz (and thus a period of 500 microseconds), and at a microprocessor clock period of one microsecond, the highest available PWM resolution is one part in 250 for zero flow to full flow in each direction, as compared with a valve resolution of better than one part in 1,000 for flow in one direction and typical of current servo valve designs.

A further problem that reduces available PWM accuracy and resolution is associated with timer interrupt latency inherent in current microprocessor-based control schemes. That is, transitions of the pulse width modulated signal from high to low and low to high are handled by a pulse width timer interrupt routine in software. Depending upon the instructions being executed when a pulse width timer interrupt occurs, four to seven microseconds can elapse before the software interrupt routine is executed. There is thus a quasi-random timing error of up to three microseconds, which can be viewed as noise on the PWM signal that adversely affects system performance, particularly in high response systems.

It is therefore a general object of the present invention to provide a system and method for generating a pulse width modulated signal to control devices, such as electrohydraulic equipment, that address the foregoing problems in the art. A more specific object of the present invention is to provide a system and method of the described character that improve resolution of the pulse width modulated control signal to at least a resolution of one part in 1,000, which is typical for electrohydraulic servo valves of current design technology. Yet another object of the invention is to provide a system and method for obtaining high resolution pulse width modulation that may be implemented in current microprocessor-based systems of the described character through modification of control software and without any change in existing hardware.

SUMMARY OF THE INVENTION

The present invention contemplates a system and method for generation of high resolution pulse width modulated signals to controllable devices, such as a servo valve responsive to pulse width modulated electrical control signals for variably controlling flow of hydraulic fluid. A microprocessor-based controller is responsive to input command signals from a remote master controller or the like for generating a flow command signal that is updated at the predetermined sampling frequency of the controller. A pulse width modulated control signal is directed to the controlled device, such as a servo valve torque motor, as a function of the flow command signal, with the pulse width modulated control signal being at constant frequency greater than the controller sampling frequency, and having a duty cycle that varies as a function of direction and quantity of flow desired at the valve.

In accordance with a first important aspect of the present invention, duration of individual half-cycles in the pulse width modulated control signal is separately controlled for each pulse cycle while maintaining the fixed pulse width modulation frequency. Specifically, the duration of each individual half-cycle in the pulse width modulated control signal is selectively incremented or decremented by increments of the microprocessor clock period. Thus, in the example discussed above, having a sampling interval of six milliseconds and a pulse width modulation period of 0.5 milliseconds, there are twelve pulse width modulation half-cycles (two per cycle) in each sampling interval. Ability to increment or decrement each of the pulse width modulated half-cycles by one clock period (of one microsecond) thus yields an improved theoretical resolution of one part in three thousand from zero to full flow in either direction—i.e., by a factor of twelve in this example.

In accordance with a second important aspect of the present invention, the problem of interrupt latency error discussed above is overcome by measuring the time required to enter the interrupt routine, and then automatically compensating for variations in such interrupt entry time. That is, a pulse duration timer determines duration of each pulse in the pulse width modulated control signal, and an interrupt is automatically generated when the timer times out. The timer keeps running and the number of microprocessor clock cycles (periods) is measured between generation of the timer interrupt and actual initiation of the interrupt routine. The interrupt routine is then automatically delayed for a second number of clock periods complementary to the entry time, so that transition of the pulse width modulated signal thereafter implemented by the interrupt routine automatically takes place a predetermined and fixed number of clock periods after generation of the timer interrupt. Further, in implementing both aspects of the invention in the preferred embodiment thereof, duration of each half-cycle in the modulated control signal is lengthened or shortened by one clock cycle through selective delay or advance in reloading the pulse width timer by one microprocessor clock cycle.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
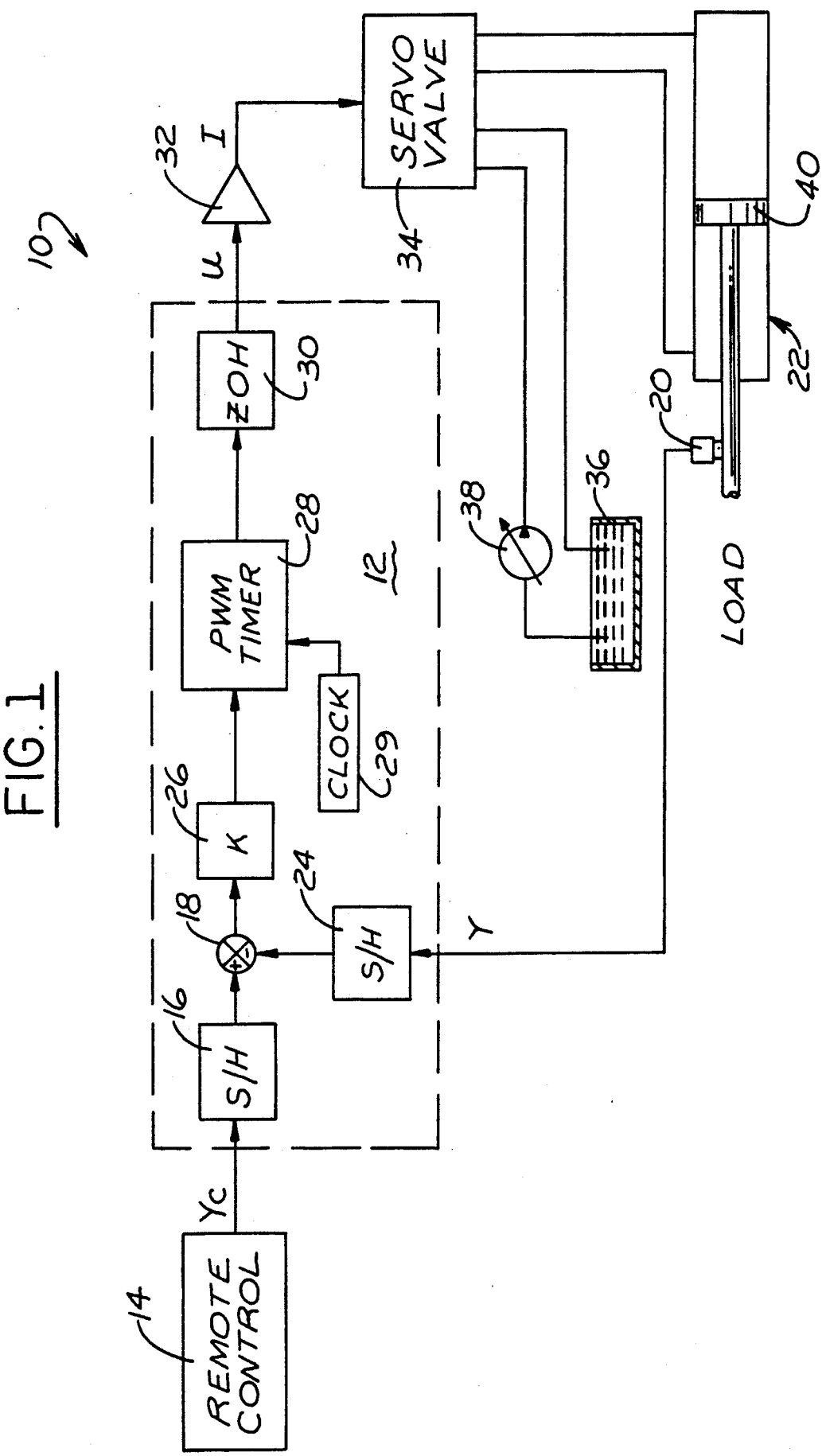
FIG. 1 is a functional block diagram of an electrohydraulic servo system that includes microprocessor-based control electronics in accordance with a presently preferred implementation of the invention.

FIG. 1 illustrates an electrohydraulic servo system 10 that includes a microprocessor-based controller 12 receiving a position command input Yc from a remote master controller 14. The input command is fed through a sample-and-hold (s/h) circuit 16 to one input of a summer 18. The other input of summer 18 receives a signal Y from a sensor 20 indicative of actual position at an actuator 22. Signal Y is fed to summer 18 through an s/h circuit 24. The output of summer 18, representing a difference between position command Yc and actual position Y, is multiplied at 26 by a constant K and fed to a pulse width modulation (PWM) timer 28. Timer 28 is driven by the microprocessor clock 29. The output of timer 28 is fed through a zero-order hold circuit 30 as a command voltage U to a PWM amplifier 32, and then as a command current I to the torque motor of a servo valve 34. Servo valve 34 thus controls flow of hydraulic fluid from a sump 36 and a pump 38 to opposite sides of the piston 40 of actuator 22.

To the extent thus far described, the system of FIG. 1 typifies pulse width modulated servo valve control as disclosed in the various U.S. Patents noted above. In the preferred implementation of the invention, controller 12, including amplifier 32, are microprocessor-based and carried as a single assembly with servo valve 34, as disclosed in U.S. Pat. No. 4,757,747, the disclosure of which is incorporated herein by reference. It will be appreciated in connection with the following discussion of the invention, however, that the same is in no way limited to servo valve control of actuators 22, but could as well be implemented in conjunction with servo control of hydraulic pumps or motors, for example, or indeed in conjunction with any device of a character suitable for control through a pulse width modulated electrical signal.

Figure 2:
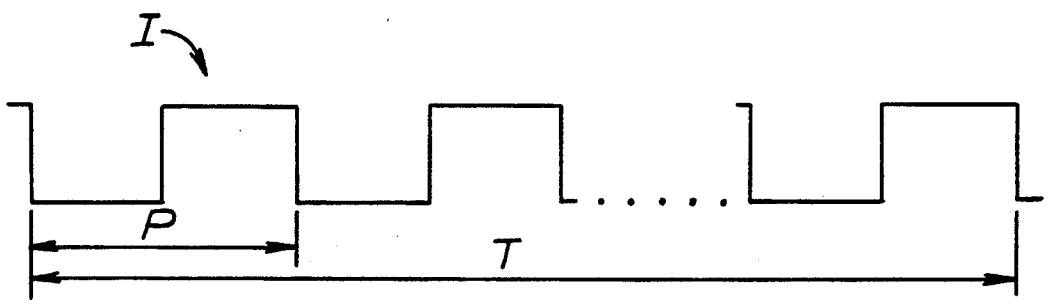
FIG. 2-5 are graphic illustrations useful in describing operation of the invention.
Figure 3:
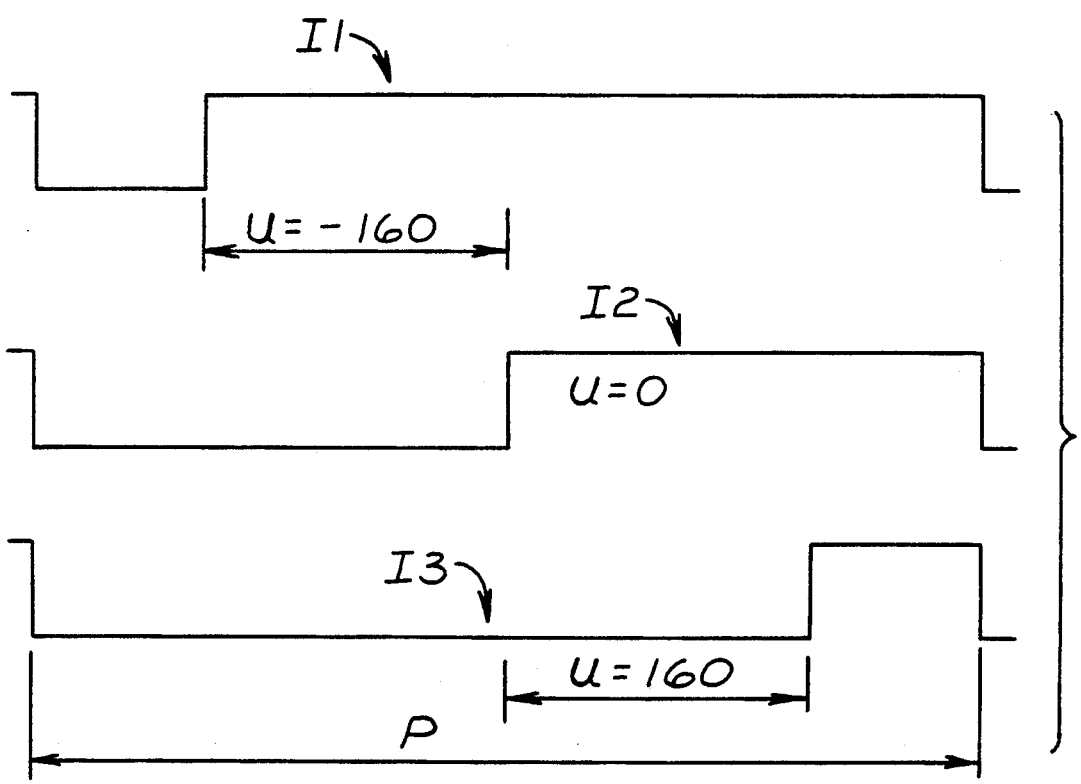

FIG. 2 illustrates a typical PWM signal I having a frequency of 2,000 Hz, and thus a period P of 0.5 ms. There are thus twelve PWM half-cycles of alternating polarity in a controller sampling period T of six milliseconds. A 50/50 duty cycle illustrated in FIG. 2 centers the spool of valve 34 (FIG. 1), resulting in zero flow of hydraulic fluid from pump 38 to actuator 22. A theoretical flow command U (FIG. 1) of −250 units may yield a 100 percent duty cycle, resulting in full flow in one direction at servo valve 34, whereas a theoretical signal U of +250 units may result in a zero percent duty cycle and full flow in the opposite direction. For a microprocessor clock period of one microsecond, theoretical resolution is thus one part in 250 for zero to full flow in either direction. In practice, however, because of servo valve current saturation, software interrupt time and other considerations, flow command U in this example would only be allowed to vary from −160 to +160 units, resulting in a pulse width modulation signal I1 (FIG. 3) for full flow in one direction when U equal −160, a signal I2 at 50/50 duty cycle when U equals zero, and a signal I3 for full flow in the other direction when U equals +160. In this example, actual available resolution in accordance with the prior art is thus one part in 160 in either flow direction.

Figure 4:
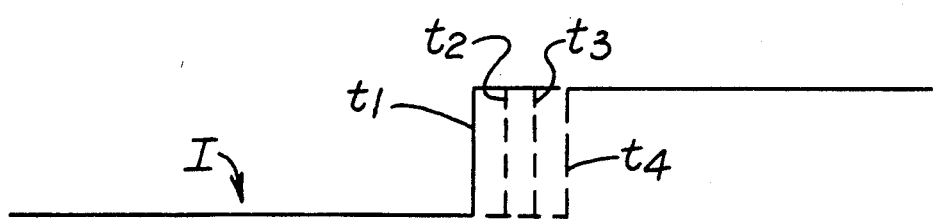

FIG. 4 illustrates the problem of controlling transition of the PWM signal I through a software interrupt routine in accordance with the prior art. Depending upon what instruction is being executed when pulse width timer 28 (FIG. 1) times out, it can take anywhere from four to seven microseconds before the software interrupt is executed. The transition illustrated in FIG. 4 can thus occur at any one of the times t1, t2, t3 or t4, resulting in quasi-random "noise" on the pulse width modulated signal that affects system performance. This is particularly the case in high response systems in which such noise on the control signal can cause small random motions at the actuator.

Figure 6:
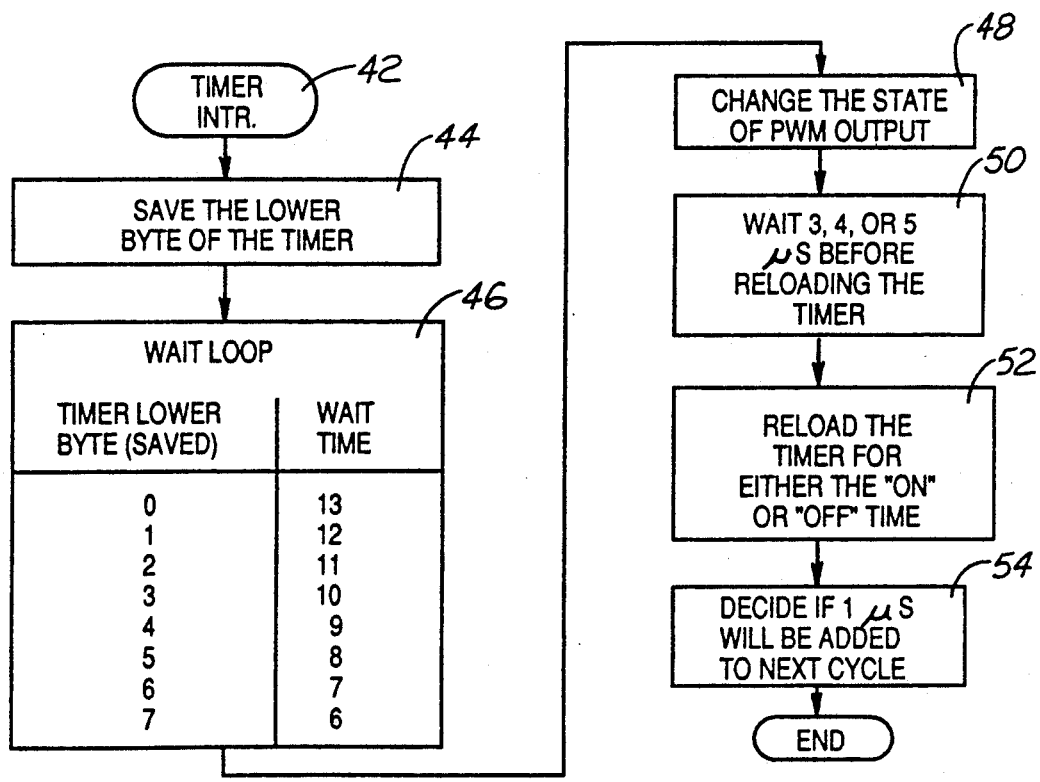
FIG. 6 is a flow chart illustrating operation of the pulse width modulation interrupt routine in accordance with a presently preferred embodiment of the invention.

FIG. 6 is a flow chart that illustrates a presently preferred embodiment of a control technique for implementation in microprocessor-based controller 12 (FIG. 1), both to overcome interrupt latency error and to improve pulse width modulation resolution, in accordance with a presently preferred embodiment of the invention. Timer 28 (FIG. 1) is preloaded with a number indicative of desired control signal half-cycle duration, and is thereafter incremented by microprocessor clock 29. When timer 28 times out, such as when the timer overflows from a hexadecimal count of FFFF to 0000, a timer interrupt 42 (FIG. 6) is generated. In the meantime, timer 28 (FIG. 1) continues to be incremented by the microprocessor clock. When timer interrupt 42 is answered and microprocessor operation enters the interrupt routine of FIG. 6, the lower byte of timer 28 is saved at 44, and thus provides an indication of the number of clock cycles that had occurred between generation of the timer interrupt, when the timer overflowed to the count of 0000, and entry to the interrupt routine. As a next step 46, further processing is delayed for a "wait time" equal to a number of one-microsecond clock periods complementary to the timer byte saved in step 44. That is, further processing is delayed for a time sufficient to render the total time between generation of the timer interrupt and changing of the PWM output state at 48 equal to some specific predetermined time, such as thirteen microseconds in the illustration of FIG. 6. Thus, the output state of PWM signal I is toggled from low to high or from high to low exactly thirteen microseconds after generation of each timer interrupt 42, thereby completely eliminating interrupt latency error illustrated in FIG. 4 and increasing timer accuracy to the one-microsecond period of the microprocessor clock.

Following change of PWM output state at 48 (FIG. 6), and in accordance with another aspect of the present invention, further action is delayed 50 for either three, four or five clock cycles (microseconds) before PWM timer 28 (FIG. 1) is reloaded 52 with the next PWM half-cycle duration. That is, delay 50 either subtracts one microsecond from the next PWM half-cycle time through a delay of only three clock periods, does not change half-cycle time for a delay of four clock periods, or effectively adds one microsecond to the half-cycle duration through a delay of five clock periods. The timer is then reloaded at 52 for the next "on" or "off" half-cycle duration of PWM signal I. The number so loaded into timer 28 depends upon nominal desired duty cycle for the PWM signal, and is updated each sampling interval T for all PWM pulses collectively. For example, for signal I1 in FIG. 3, nominal "off" time would be 90 (250−160) microseconds, while nominal "on" time would be 410 (250+160) microseconds. These figures remain constant throughout each sampling interval T. A decision is then made at 54 whether one clock period (one microsecond) should be added to or subtracted from the next half-cycle either to offset subtraction or addition at the previous half-cycle so that PWM period P (FIGS. 2-3) remains constant, or for enhanced control during the next PWM cycle.

Figure 5:
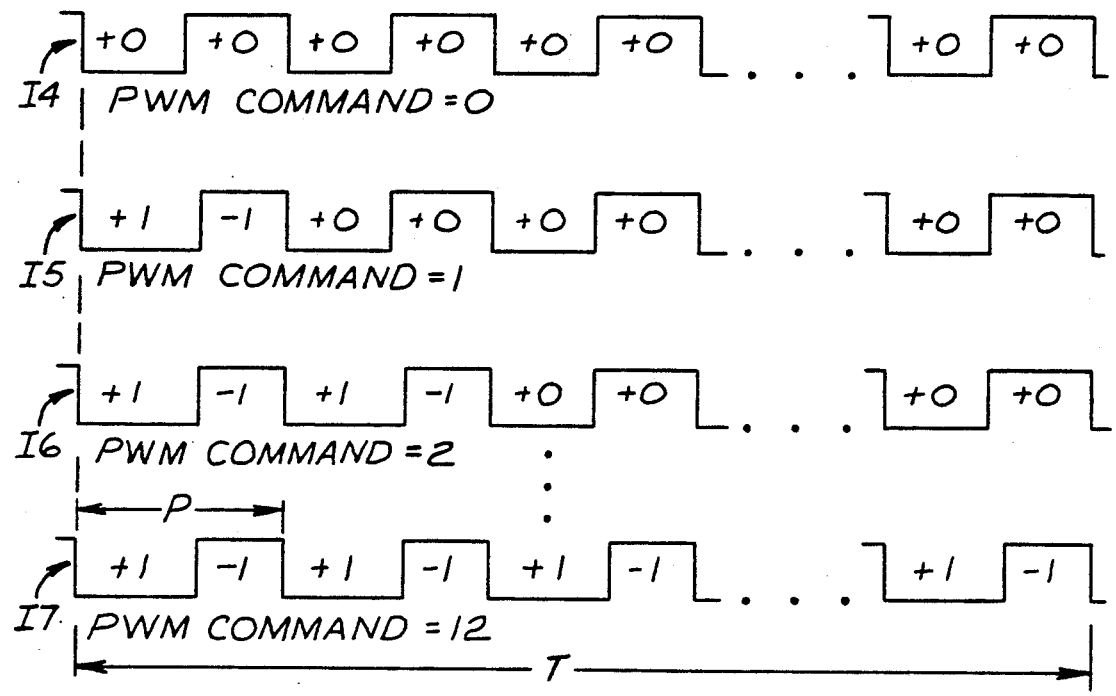

The result of steps 48 through 54 in FIG. 6 is illustrated in FIG. 5. Signal I4 illustrates PWM signal I at uniform duty cycle throughout sampling interval T, in this case approximately 50/50 duty cycle. Signal I5 illustrates addition of one clock period to the first PWM half-cycle, through a delay 50 (FIG. 6) of five clock periods, followed by subtraction of one clock period from the second PWM half-cycle, through a delay 50 of only three clock periods and thereby maintaining constant PWM period P. The remaining half-cycles in signal I5 are unchanged throughout sampling period T, so that the control variation between signals I4 and I5 amounts to one part in 1920 in the example of FIG. 3. Similarly, signal I6 in FIG. 5 illustrates addition of one clock period to the first and second "off" half-cycles of the command signal, and corresponding subtraction of one clock period from the first and second "on" half-cycles. In signal I7, a duration at one clock period is added to each of the twelve "off" half-cycles during the sample period T, while one clock period is correspondingly subtracted from "on" half-cycles. Thus one microsecond is added to or subtracted from each of the PWM signal half-cycles. It will be appreciated, of course, that other techniques may be employed for addition and subtraction of multiple clock periods from the PWM signal half-cycles for yet more enhanced resolution, where desirable.

The preferred embodiment thus addresses what otherwise appears to be a limitation in pulse width resolution because of the sampling period—i.e., at a base PWM frequency of 2000 Hz and with a 6 ms sampling period, there are only 12 on-off periods that can be manipulated. If the sampling time could be doubled, the resolution would double. By the same token, if this concept is used within the framework of an analog system, then resolution can be increased by averaging more and more on-off cycles to the point that the averaging device (e.g., analog valve) no longer responds to the average but begins to respond to the modulation frequency resulting from the adding or subtracting time increments. The lowest modulation frequency should be at least ten times the averaging device bandpass.

As an example, if a valve has a 10 Hz bandpass, then the lowest modulation frequency should be 100 Hz, the average must be established in 0.01 seconds, and on-off time intervals may be manipulated if the base PWM frequency is 2000 Hz. If a 1 Hz averaging device is used, then 200 on-off time intervals may be manipulated. Thus, resolution is improved still further as the averaging device has less and less bandpass.

The invention claimed is:

1. An electrohydraulic system comprising
means responsive to an electrical control signal for variably controlling flow of hydraulic fluid, and
microprocessor-based control means including means for receiving an input command, means for generating a flow command as a function of said input command, means for sampling said input command and updating said flow command at predetermined fixed sampling intervals, and means for directing a pulse width modulated control signal to said flow-controlling means as a function of said flow command,
said pulse width modulated control signal consisting of a continuous series of alternating on and off half-cycles at a fixed period less than said sampling interval, all on half-cycles having an identical base time duration and all off half-cycles having an identical base time duration, said base time durations being updated at each said sampling interval and remaining constant during each sampling interval,
said control means further including means for selectively increasing or decreasing time durations of said on and off half-cycles from said base time durations within each said sampling interval while maintaining constant said fixed period of said pulse width modulated control signal.

2. The system set forth in claim 1 wherein said microprocessor-based control means includes a clock having a fixed clock period, and wherein said means for selectively increasing or decreasing time durations of said on and off half-cycles from said base time durations comprises means for selectively incrementing one of said on and off half-cycles by a number of increments of said clock period and decreasing the other of said on and off half-cycles by the same number of increments of said clock period so as to maintain constant said fixed period of said pulse width modulated control signal.

3. The system set forth in claim 2 wherein said microprocessor-based control means includes means forming a pulse duration timer, means responsive to a signal from said timer to initiate a control cycle, means responsive to said clock for measuring a time interval as a first number of said clock periods between said timer signal and initiation of said control cycle, means for delaying operation of said control cycle for a second number of said clock periods complementary to said first number so that the sum of said first and second numbers is constant, means for changing state of said pulse width modulated control signal following said second number of clock periods for initiating a next half-cycle of said control signal, and means for reinitiating operation of said timer for a time duration corresponding to desired duration of said next half-cycle.

4. The system set forth in claim 3 wherein said means for selectively increasing or decreasing said time duration comprises means for delaying reinitiation of said timer for a third number of said clock periods corresponding to desired increase or decrease of said duration of said next half-cycle.

5. The system set forth in claim 2 wherein said number of increments comprises one increment of said clock period.

* * * * *